Patented June 25, 1946

2,402,891

UNITED STATES PATENT OFFICE 2,402,891

PREPARATION OF DIOLEFIN SULPHONES

George W. Hooker, Lewis R. Drake, and Stephen C. Stowe, Midland, Mich., assignors to The Dow Chemical Company, Midland, Mich., a corporation of Michigan No Drawing. Application May 6, 1940, Serial No. 333,598

4 Claims. (Cl. 260—329)

This invention concerns an improved method for making conjugated diolefin sulphones by reaction between the corresponding diolefins and sulphur dioxide, and in particular relates to the separation of conjugated diolefins from hydrocarbon mixtures comprising the same by means of such reaction. More specifically, it concerns the separation of butadiene from mixtures thereof with other aliphatic hydrocarbons, particularly butylenes and butane.

In the manufacture of butadiene by the pyrolysis of hydrocarbon oils, there is initially obtained a hydrocarbon mixture comprising in addition to the desired butadiene various other hydrocarbons, such as methane, ethane, propane, ethylene, propylene, butylene, acetylene, etc., and hydrogen. The hydrocarbons having four carbon atoms in the molecule, i. e. butadiene, butane, and the butylenes, may readily be separated from the other components of the mixture by liquefaction and distillation, but they cannot readily be separated from each other except by chemical treatment. Such chemical treatment usually consists in preferentially reacting the butadiene with sulphur dioxide to form crystalline butadiene sulphone which may be separated from the unreacted butylenes and butane and thereafter decomposed by heat to regenerate butadiene. The reaction has heretofore been carried out simply by heating the hydrocarbon mixture with sulphur dioxide under sufficient pressure to maintain the reaction mixture in the liquid state. Such mode of operation, however, is disadvantageous in that a large proportion of the butadiene sulphone product is obtained in an amorphous form which is difficult to handle and which does not readily yield butadiene upon decomposition, and although it is possible to reduce greatly the formation of such product by carrying out the reaction at room temperature in the presence of certain inhibitors, the reaction under such conditions requires too long a time to be commercially practical. When operating at moderately elevated temperatures, e. g. 60°–150° C., the formation of the amorphous type of product, in addition to reducing the yield of the desired crystalline product, is further disadvantageous in that the amorphous material tends to form a hard heat-insulating crust on the walls of the reaction vessel, resulting in difficulties of temperature control and poor thermal efficiency.

We have now found that by introducing a portion of either or both of the reactants into the reaction vessel in the vapor phase, the latent heat of condensation of said vapor is sufficient to heat the mixture to the required reaction temperature. By operating in this manner, the temperature may be readily and accurately controlled simply by varying the proportion of the reactants employed in the vapor phase, with consequent increase in the yield of desired product and simplicity of operation. Furthermore, since the heat is supplied to the reaction mixture internally rather than through the walls of the reaction vessel, there is less tendency for the formation of an incrustation of the amorphous type of sulphone within the vessel, and the small amount which does form does not lower thermal efficiency or affect reaction control.

In preparing conjugated diolefin sulphones according to the method of the invention, the reaction is preferably carried out in a continuous manner at a temperature between about 60° C. and about 150° C., although a batch process may be employed. Ordinarily, we employ at least 0.75 part, preferably 1–3 parts, by weight of sulphur dioxide per part of the conjugated diolefin. As hereinbefore stated, either the diolefin or the sulphur dioxide, or both, may be introduced into the reaction vessel partially in the vapor state. In practice, however, it is preferable to employ only the sulphur dioxide in the vapor phase since the diolefin polymerizes to a small extent when vaporized, and the accumulation of polymer over a long period of time may plug the equipment. Accordingly, the diolefin is usually passed directly into the reaction vessel in the liquid state, whereas a portion of the sulphur dioxide is introduced in vapor phase. Such proportion is such that the reaction mixture is heated to the desired temperature by the heat content and/or the latent heat of condensation of the sulphur dioxide vapor. When approximately equal parts of the diolefin and sulphur dioxide are employed, this proportion amounts to from one-quarter to one-half of the total amount of sulphur dioxide. Ordinarily, the sulphur dioxide is passed in the liquid state into a preheater where the required proportion is vaporized, and the resulting liquid and vapor mixture is passed directly into the reaction vessel. If desired, however, the liquid and gaseous sulphur dioxide may be passed into the reaction vessel through separate supply lines. As the sulphur dioxide vapor comes into contact with the liquefied mixture of the diolefin and sulphur dioxide within the reaction vessel, it condenses, giving up its latent heat of condensation which raises the temperature of the mixture. Since the sulphur dioxide vapor is introduced into the reaction vessel at a temperature slightly higher than the reaction temperature, additional heat is supplied to the reaction mixture as a result of the greater heat content of the sulphur dioxide vapor. The heat of reaction between the sulphur dioxide and the diolefin is sufficient to maintain the reaction temperature once the reactants have been heated to that temperature.

As disclosed in our co-pending application, Serial No. 248,882, filed December 31, 1938, the temperature of the mixture is preferably lowered as the reaction progresses from an initial temperature of 100°–150° C. to a final temperature of about 80° C. or lower, but the mixture may, if desired, be maintained at a constant temperature until the reaction is complete. When the latter mode of operation is employed, the constant reaction temperature is preferably between about 60° C. and about 120° C. Also, if desired, any of the known inhibitors, such as catechol, phenol, copper salicylate, etc., may be present to suppress the formation of the amorphous type of sulphone product.

The reaction product consists essentially of a mixture of the diolefin sulphone and sulphur dioxide, together with any hydrocarbons, such as butylenes or butane, which may have been present in the diolefin reactant. The latter vaporize from the product upon releasing the pressure and may be recovered in a form relatively free of the diolefin. If desired, the vapors may be treated, e. g. with water or an alkali, to remove the sulphur dioxide therein. Excess sulphur dioxide remaining with the sulphone may be vaporized off by mild heating or by applying a vacuum. The sulphone may then be dissociated into the diolefin and sulphur dioxide by somewhat more vigorous heating, e. g. heating at about 120° C. or higher, and the pure diolefin may be separated from its mixture with sulphur dioxide in any of the usual ways, e. g. by scrubbing the sulphur dioxide from the mixture with water or by passing the vapor mixture through an aqueous alkali.

The following example illustrates the application of the principle of our invention to the separation of butadiene from hydrocarbon mixtures comprising the same, but is not to be construed as limiting the invention:

*Example*

A liquefied hydrocarbon mixture containing approximately 50 per cent by weight of butadiene, the remainder being largely butylenes and small amounts of acetylenes and butane, to which has been added about 0.01 part by weight of tertiary-butyl catechol as an inhibitor against the formation of the amorphous type of butadiene sulphone, is pumped under a pressure of about 500–600 pounds per square inch into the top of a 4″ x 20′ vertical autoclave. Simultaneously, from 2 to 6 parts by weight of liquid sulphur dioxide is pumped through a steam-heated preheater and into the top of the autoclave. Within the preheater, a portion of the sulphur dioxide is vaporized, so that a temperature of about 110° C. is maintained at the top of the autoclave by reason of the heat content and latent heat of condensation of the sulphur dioxide vapor as well as by the heat of reaction of the butadiene with the sulphur dioxide. The temperature is very readily controlled by varying the amount of sulphur dioxide supplied to the autoclave in vapor form, i. e. by varying the amount of steam supplied to the preheater. The autoclave is surrounded by a jacket through which cooling water is passed in such a manner that the temperature at the bottom of the autoclave is maintained at about 80° C. The rate of flow of the reaction mixture through the autoclave is approximately 5 feet per hour, so that the reaction time is about 4 hours. The product leaving the bottom of the autoclave consists of a liquefied mixture of butadiene sulphone, sulphur dioxide, and unreacted butylenes, acetylenes, and butane. Upon releasing the pressure on this mixture, the sulphur dioxide and unreacted hydrocarbons are vaporized therefrom, and the butadiene sulphone product is obtained as a white crystalline solid. This product is then heated to a temperature of about 120° C. whereby it is decomposed into a gaseous mixture of butadiene and sulphur dioxide from which the latter is removed by absorption in water or a dilute alkali, leaving the butadiene in substantially pure form.

It will be understood that the invention is not limited to the preparation of butadiene sulphone or to the separation of butadiene from hydrocarbon mixtures as herein explained, but may also be applied in making sulphones of other conjugated diolefins, e. g., isoprene, 2.3-dimethyl-butadiene-1.3, piperylene, etc. It may also be applied to the separation of such diolefins from mixtures thereof with other hydrocarbons.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making a diolefin sulphone by reaction of a conjugated diolefin with sulphur dioxide in liquid phase under superatmospheric pressure at a temperature between about 60° C. and about 150° C., the step which consists in introducing into the reaction mixture vapors of at least one of the reactants at a temperature between 60° and 150° C. and approximating the temperature within the range just stated at which the reaction is, in its earlier stages, to be carried out and in amount and at a pressure sufficient to heat the mixture from a lower temperature to the reaction temperature by means of the heat liberated upon condensation of the said vapors.

2. Method according to claim 1, in which vapors of sulphur dioxide are introduced into the liquid reaction mixture to heat the same to a reaction temperature.

3. The method which comprises mixing liquefied butadiene with liquid and gaseous sulphur dioxide, the latter being pre-heated to a temperature between 100° and 150° C. and approximating the temperature within the range just stated at which the reaction, in its earlier stages, is to be carried out, the admixing being accomplished under sufficient pressure to cause liquefaction of the gaseous sulphur dioxide and said gaseous sulphur dioxide being admixed in an amount and at a pressure sufficient to heat the reaction mixture from a lower temperature to an initial reaction temperature between about 100° C. and about 150° C. upon condensation of the gas; and thereafter reducing the temperature of the mixture as the reaction progresses so that the reaction is completed at a temperature not substantially exceeding 80° C.

4. The method which comprises mixing a liquefied hydrocarbon mixture comprising butadiene with liquid and gaseous sulphur dioxide in the presence of an agent capable of inhibiting the formation of the amorphous type of butadiene sulphone and under sufficient pressure to cause liquefaction of the gaseous sulphur dioxide, said gaseous sulphur dioxide being pre-heated to a temperature between 100° and 150° C. and approximating that at which the reaction, in its earlier stages, is to be carried out and said gaseous sulphur dioxide being added in an amount and at a pressure sufficient to heat the reaction mixture to an initial reaction temperature between about 100° C. and about 150° C. upon condensation of the gas; and thereafter reducing the temperature of the mixture as the reaction progresses so that the reaction is completed at a temperature not substantially exceeding 80° C.

GEORGE W. HOOKER.
LEWIS R. DRAKE.
STEPHEN C. STOWE.